United States Patent
Bhaskar et al.

(10) Patent No.: US 9,215,886 B2
(45) Date of Patent: Dec. 22, 2015

(54) METHOD FOR MAKING A LOW-ACRYLAMIDE CONTENT SNACK WITH DESIRED ORGANOLEPTICAL PROPERTIES

(75) Inventors: Ajay Rajeshwar Bhaskar, Allen, TX (US); Michael Grant Topor, Little Elm, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1485 days.

(21) Appl. No.: 12/329,227

(22) Filed: Dec. 5, 2008

(65) Prior Publication Data

US 2010/0143540 A1 Jun. 10, 2010

(51) Int. Cl.
  *A23L 1/216* (2006.01)
  *A23L 1/2165* (2006.01)
  *A23L 1/015* (2006.01)
  *A23L 1/09* (2006.01)

(52) U.S. Cl.
  CPC .............. *A23L 1/2165* (2013.01); *A23L 1/015* (2013.01); *A23L 1/095* (2013.01)

(58) Field of Classification Search
  USPC ........................................................ 426/637
  See application file for complete search history.

(56) References Cited

U.S. PATENT DOCUMENTS

| | | | |
|---|---|---|---|
| 1,053 A | 12/1838 | Hatfield | |
| 1,782,960 A | 11/1930 | Erysin | |
| 2,448,152 A | 8/1948 | Patton | |
| 2,490,431 A | 12/1949 | Greene | |
| 2,498,024 A | 2/1950 | Baxter | |
| 2,584,893 A | 2/1952 | Lloyd | |
| 2,611,705 A | 9/1952 | Hendel | |
| 2,704,257 A | 3/1955 | deSellano | |
| 2,744,017 A | 5/1956 | Baldwin | |
| 2,759,832 A | 8/1956 | Cording, Jr. | |
| 2,762,709 A | 9/1956 | Janis | |
| 2,780,552 A | 2/1957 | Willard | |
| 2,893,878 A | 7/1959 | Simon | |
| 2,905,559 A | 9/1959 | Anderson | |
| 2,910,367 A | 10/1959 | Melnick | |
| 2,959,487 A * | 11/1960 | Notter et al. | 426/444 |
| 2,987,401 A | 6/1961 | Johnston | |

(Continued)

FOREIGN PATENT DOCUMENTS

| | | |
|---|---|---|
| CL | 4032002 | 6/2003 |
| DE | 2743230 A1 | 4/1979 |

(Continued)

OTHER PUBLICATIONS

Coffin: Effect of Low Temperature Storage on Sugar Concentrations and Chip Color of Certain Processing Potato Cultivars and Selections. Journal of Food Science, 52: 639-645; 1987.*

(Continued)

*Primary Examiner* — Paricia George
(74) *Attorney, Agent, or Firm* — James R. Gourley; Colin P. Cahoon; Carstens & Cahoon, LLP

(57) ABSTRACT

A method for making a food product with a low acrylamide content having organoleptical properties comparable to traditional food products. Potatoes containing a low reducing sugar concentration are used to make potato flakes. Dextrose is added to the low reducing sugar potato flakes to increase the total reducing sugar concentration.

20 Claims, 1 Drawing Sheet

(56) References Cited

U.S. PATENT DOCUMENTS

| | | | |
|---|---|---|---|
| 3,026,885 A | 3/1962 | Eytinge | |
| 3,027,258 A | 3/1962 | Markakis | |
| 3,038,810 A | 6/1962 | Akerboom | |
| 3,044,880 A | 7/1962 | Bogyo | |
| 3,085,020 A | 4/1963 | Backinger | |
| 3,219,458 A | 11/1965 | Higby | |
| 3,278,311 A | 10/1966 | Brown | |
| 3,305,366 A | 2/1967 | Sutton | |
| 3,359,123 A | 12/1967 | Katucki | |
| 3,365,301 A | 1/1968 | Lipoma | |
| 3,369,908 A | 2/1968 | Gonzalez | |
| 3,370,627 A | 2/1968 | Willard | |
| 3,404,986 A | 10/1968 | Wimmer | |
| 3,436,229 A | 4/1969 | Simpson | |
| 3,460,162 A | 8/1969 | Sijbring | |
| 3,545,979 A | 12/1970 | Ghafoori | |
| 3,578,463 A | 5/1971 | Smith | |
| 3,608,728 A | 9/1971 | Trimble | |
| 3,620,925 A | 11/1971 | Mochizuki | |
| 3,627,535 A | 12/1971 | Davidson | |
| 3,634,095 A | 1/1972 | Willard | |
| 3,652,402 A | 3/1972 | Chibata | |
| 3,687,679 A | 8/1972 | Sijbring | |
| 3,690,895 A | 9/1972 | Amadon | |
| 3,725,087 A | 4/1973 | Miller | |
| 3,773,624 A | 11/1973 | Wagner | |
| 3,782,973 A | 1/1974 | Pittet | |
| 3,812,775 A | 5/1974 | Sijbring | |
| 3,849,582 A | 11/1974 | Blagdon | |
| 3,851,572 A | 12/1974 | Lazzarini | |
| 3,870,809 A | 3/1975 | Green | |
| 3,914,436 A | 10/1975 | Nakadai | |
| 3,917,866 A | 11/1975 | Purves | |
| 3,925,568 A | 12/1975 | Rao | |
| 3,987,210 A | 10/1976 | Cremer | |
| 3,997,684 A | 12/1976 | Willard | |
| 3,998,975 A | 12/1976 | Liepa | |
| 4,005,225 A | 1/1977 | Craig | |
| 4,073,952 A | 2/1978 | Standing | |
| 4,084,008 A | 4/1978 | Yueh | |
| 4,122,198 A | 10/1978 | Wisdom | |
| 4,124,727 A | 11/1978 | Rockland | |
| 4,136,208 A | 1/1979 | Light | |
| 4,140,801 A * | 2/1979 | Hilton et al. | 426/49 |
| 4,167,137 A | 9/1979 | van Remmen | |
| 4,192,773 A | 3/1980 | Yoshikawa | |
| 4,199,612 A | 4/1980 | Fragas | |
| 4,210,594 A | 7/1980 | Logan | |
| 4,251,895 A | 2/1981 | Caridis | |
| 4,272,554 A | 6/1981 | Schroeder | |
| 4,277,510 A | 7/1981 | Wicklund | |
| 4,293,582 A * | 10/1981 | Hamann et al. | 426/637 |
| 4,312,892 A | 1/1982 | Rubio | |
| 4,317,742 A | 3/1982 | Yamaji | |
| 4,348,417 A * | 9/1982 | Greup et al. | 426/19 |
| 4,366,749 A | 1/1983 | Caridis | |
| 4,394,398 A | 7/1983 | Wilson | |
| 4,418,088 A | 11/1983 | Cantenot | |
| 4,461,832 A | 7/1984 | Tschang | |
| 4,537,786 A | 8/1985 | Bernard | |
| 4,555,409 A | 11/1985 | Hart | |
| 4,582,927 A | 4/1986 | Fulcher | |
| 4,594,260 A | 6/1986 | Vaqueiro | |
| 4,595,597 A | 6/1986 | Lenchin | |
| 4,645,679 A | 2/1987 | Lee | |
| 4,673,581 A | 6/1987 | Fulcher | |
| 4,706,556 A | 11/1987 | Wallace | |
| 4,721,625 A | 1/1988 | Lee | |
| 4,749,579 A | 6/1988 | Haydock | |
| 4,751,093 A | 6/1988 | Hong | |
| 4,756,916 A | 7/1988 | Dreher | |
| 4,806,377 A | 2/1989 | Ellis | |
| 4,844,930 A | 7/1989 | Mottur | |
| 4,844,931 A | 7/1989 | Webb | |
| 4,863,750 A | 9/1989 | Pawlak | |
| 4,884,780 A | 12/1989 | Ohashi | |
| 4,889,733 A | 12/1989 | Willard | |
| 4,900,576 A | 2/1990 | Bonnett | |
| 4,917,909 A | 4/1990 | Prosise | |
| 4,931,296 A | 6/1990 | Shanbhag | |
| 4,933,199 A | 6/1990 | Neel | |
| 4,937,085 A | 6/1990 | Cherry | |
| 4,963,373 A | 10/1990 | Fan | |
| 4,966,782 A | 10/1990 | Heidolph | |
| 4,971,813 A | 11/1990 | Strobel | |
| 4,978,684 A | 12/1990 | Cerami | |
| 4,985,269 A | 1/1991 | Irvin | |
| 5,002,784 A | 3/1991 | Pare | |
| 5,009,903 A | 4/1991 | deFigueiredo | |
| 5,035,904 A | 7/1991 | Huang | |
| 5,045,335 A | 9/1991 | DeRooij | |
| 5,071,661 A | 12/1991 | Stubbs | |
| 5,087,467 A | 2/1992 | Schwank | |
| 5,126,153 A | 6/1992 | Beck | |
| 5,134,263 A | 7/1992 | Smith | |
| 5,137,740 A | 8/1992 | Benson | |
| 5,167,975 A | 12/1992 | Tsurumaki | |
| 5,171,600 A | 12/1992 | Young | |
| 5,176,933 A | 1/1993 | Fulcher | |
| 5,196,225 A | 3/1993 | Lush | |
| 5,232,721 A | 8/1993 | Polansky | |
| 5,279,840 A | 1/1994 | Baisier | |
| 5,292,542 A | 3/1994 | Beck | |
| 5,298,274 A | 3/1994 | Khalsa | |
| 5,356,646 A | 10/1994 | Simic-Glavaski | |
| 5,362,511 A | 11/1994 | Villagran | |
| 5,368,879 A | 11/1994 | White | |
| 5,370,898 A | 12/1994 | Zussman | |
| 5,389,389 A | 2/1995 | Beck | |
| 5,391,384 A | 2/1995 | Mazza | |
| 5,391,385 A | 2/1995 | Seybold | |
| 5,393,543 A | 2/1995 | Laufer | |
| 5,394,790 A | 3/1995 | Smith | |
| 5,441,758 A | 8/1995 | Lewis | |
| 5,447,742 A | 9/1995 | Malvido | |
| 5,458,903 A | 10/1995 | Colson | |
| 5,464,642 A | 11/1995 | Villagran | |
| 5,464,643 A | 11/1995 | Lodge | |
| 5,505,978 A | 4/1996 | Roy | |
| 5,514,387 A | 5/1996 | Zimmerman | |
| 5,534,280 A | 7/1996 | Welch | |
| 5,554,405 A | 9/1996 | Fazzolare | |
| 5,558,886 A | 9/1996 | Martinez-Bustos | |
| 5,580,598 A | 12/1996 | Benson | |
| 5,589,213 A | 12/1996 | Desai | |
| 5,603,972 A | 2/1997 | McFarland | |
| 5,603,973 A | 2/1997 | Benson | |
| 5,620,727 A | 4/1997 | Gerrish | |
| 5,676,042 A | 10/1997 | Sakuma | |
| 5,690,982 A | 11/1997 | Fazzolare | |
| 5,695,804 A | 12/1997 | Hnat | |
| 5,707,671 A | 1/1998 | Beck | |
| 5,747,084 A | 5/1998 | Cochran | |
| 5,776,531 A | 7/1998 | Aasman | |
| 5,792,499 A | 8/1998 | Atwell | |
| 5,846,589 A | 12/1998 | Baker | |
| 5,858,429 A | 1/1999 | Wallace | |
| 5,858,431 A | 1/1999 | Wiedersatz | |
| 5,887,073 A | 3/1999 | Fazzari | |
| 5,919,691 A | 7/1999 | Schulein | |
| 5,945,146 A | 8/1999 | Twinam | |
| 5,947,010 A | 9/1999 | Barry | |
| 5,972,367 A | 10/1999 | Inoue | |
| 5,972,397 A | 10/1999 | Durance | |
| 6,001,409 A | 12/1999 | Gimmler | |
| 6,016,096 A | 1/2000 | Barnes | |
| 6,025,011 A | 2/2000 | Wilkinson | |
| 6,033,707 A | 3/2000 | Lanner | |
| 6,039,978 A | 3/2000 | Bangs | |
| 6,066,353 A | 5/2000 | Villagran | |
| 6,068,872 A | 5/2000 | Hashiguchi | |
| 6,068,873 A | 5/2000 | Delrue | |
| RE36,785 E | 7/2000 | Colson | |
| 6,139,884 A | 10/2000 | Shifferaw | |

(56) References Cited

U.S. PATENT DOCUMENTS

| | | |
|---|---|---|
| 6,159,530 A | 12/2000 | Christiansen |
| 6,207,204 B1 | 3/2001 | Christiansen |
| 6,210,720 B1 | 4/2001 | Leusner |
| 6,227,421 B1 | 5/2001 | Richard |
| 6,287,672 B1 | 9/2001 | Fields |
| 6,290,999 B1 | 9/2001 | Gerrish |
| 6,299,914 B1 | 10/2001 | Christiansen |
| 6,335,048 B1 | 1/2002 | Swarvar |
| 6,358,544 B1 | 3/2002 | Henry, Jr. |
| 6,383,533 B1 | 5/2002 | Soeda |
| 6,419,965 B1 | 7/2002 | Douaire |
| 6,436,458 B2 | 8/2002 | Kuechle |
| 6,521,871 B1 | 2/2003 | Shelton |
| 6,528,768 B1 | 3/2003 | Simic-Glavaski |
| 6,531,174 B2 | 3/2003 | Barrett |
| 6,558,730 B1 | 5/2003 | Gisaw |
| 6,599,547 B1 | 7/2003 | Villagran |
| 6,602,533 B1 | 8/2003 | Smith |
| 6,607,777 B1 | 8/2003 | Walsh |
| 6,638,554 B1 | 10/2003 | Rubio |
| 6,638,558 B2 | 10/2003 | Brubacher |
| 6,716,462 B2 | 4/2004 | Prosise |
| 6,770,469 B2 | 8/2004 | Yamaguchi |
| 6,778,887 B2 | 8/2004 | Britton |
| 6,828,527 B2 | 12/2004 | Simic-Glavaski |
| 6,872,417 B1 | 3/2005 | Freudenrich |
| 6,896,528 B2 | 5/2005 | Kubota |
| 6,929,812 B2 | 8/2005 | Van Der Doe |
| 6,989,167 B2 | 1/2006 | Howie |
| 7,037,540 B2 | 5/2006 | Elder |
| 7,122,719 B2 | 10/2006 | Hakimi |
| 7,169,417 B2 | 1/2007 | Lang |
| 7,189,422 B2 | 3/2007 | Howie |
| 7,190,813 B2 | 3/2007 | Daley |
| 7,220,440 B2 | 5/2007 | Dria |
| 7,267,834 B2 | 9/2007 | Elder |
| 7,291,380 B2 | 11/2007 | Nyholm |
| 7,393,550 B2 | 7/2008 | Barry |
| 7,514,113 B2 | 4/2009 | Zyzak |
| 7,524,519 B2 | 4/2009 | Zyzak |
| 7,527,815 B2 | 5/2009 | Teras |
| 7,534,934 B2 | 5/2009 | Rommens |
| 7,763,306 B2 * | 7/2010 | Barry et al. .................. 426/637 |
| 2002/0018838 A1 | 2/2002 | Zimmerman |
| 2002/0025367 A1 | 2/2002 | Koehler |
| 2002/0129713 A1 | 9/2002 | Caridis |
| 2003/0049359 A1 | 3/2003 | Kulkarni |
| 2003/0183092 A1 | 10/2003 | Barber |
| 2003/0198725 A1 | 10/2003 | Cardenas |
| 2003/0219518 A1 | 11/2003 | Li |
| 2004/0047973 A1 | 3/2004 | Bourhis |
| 2004/0058046 A1 * | 3/2004 | Zyzak et al. .................. 426/549 |
| 2004/0086597 A1 | 5/2004 | Awad |
| 2004/0101607 A1 | 5/2004 | Zyzak |
| 2004/0105929 A1 | 6/2004 | Tomoda |
| 2004/0109926 A1 | 6/2004 | Tomoda |
| 2004/0115321 A1 | 6/2004 | Tricoit |
| 2004/0126469 A1 | 7/2004 | Tomoda |
| 2004/0131737 A1 | 7/2004 | Tomoda |
| 2004/0180125 A1 | 9/2004 | Plank |
| 2004/0180129 A1 | 9/2004 | Plank |
| 2004/0197012 A1 | 10/2004 | Bourg |
| 2004/0224066 A1 | 11/2004 | Lindsay |
| 2005/0064084 A1 * | 3/2005 | Elder et al. .................. 426/637 |
| 2005/0068535 A1 | 3/2005 | Bond |
| 2005/0074538 A1 | 4/2005 | Elder |
| 2005/0079254 A1 | 4/2005 | Corrigan |
| 2005/0118322 A1 | 6/2005 | Elder |
| 2005/0152811 A1 | 7/2005 | Taylor |
| 2005/0196504 A1 | 9/2005 | Finley |
| 2005/0214411 A1 * | 9/2005 | Lindsay et al. .................. 426/62 |
| 2006/0019007 A1 | 1/2006 | Baas |
| 2006/0029992 A1 | 2/2006 | Grune |
| 2006/0088633 A1 | 4/2006 | Barber |
| 2006/0110503 A1 | 5/2006 | Bates |
| 2006/0127534 A1 | 6/2006 | Elder |
| 2006/0193964 A1 | 8/2006 | Eckhoff |
| 2006/0210693 A1 | 9/2006 | Oftring |
| 2006/0216376 A1 | 9/2006 | Milici |
| 2006/0216388 A1 | 9/2006 | Christensen |
| 2007/0042080 A1 | 2/2007 | Plomp |
| 2007/0087101 A1 | 4/2007 | Gusek |
| 2007/0141225 A1 | 6/2007 | Elder |
| 2007/0141226 A1 | 6/2007 | Elder |
| 2007/0141227 A1 | 6/2007 | Boudreaux |
| 2007/0148318 A1 | 6/2007 | Rubio |
| 2007/0166439 A1 | 7/2007 | Soe |
| 2007/0178219 A1 | 8/2007 | Boudreaux |
| 2007/0184175 A1 | 8/2007 | Rubio |
| 2007/0196556 A1 | 8/2007 | Van Der Meer |
| 2007/0281062 A1 | 12/2007 | Bourg |
| 2007/0292589 A1 | 12/2007 | Elder |
| 2008/0003340 A1 | 1/2008 | Karwowski |
| 2008/0008780 A1 | 1/2008 | Streekstra |
| 2008/0101657 A1 | 5/2008 | Durkin |
| 2008/0138480 A1 | 6/2008 | Bows |
| 2008/0144880 A1 | 6/2008 | DeLuca |
| 2008/0166450 A1 | 7/2008 | Corrigan |
| 2008/0166452 A1 | 7/2008 | Corrigan |
| 2008/0253648 A1 | 10/2008 | Mulder |
| 2008/0268111 A1 | 10/2008 | Grune |
| 2008/0279994 A1 | 11/2008 | Cantley |
| 2008/0299273 A1 | 12/2008 | Bhaskar |
| 2009/0047725 A1 | 2/2009 | Elder |
| 2009/0074915 A1 | 3/2009 | Hendriksen |
| 2009/0098265 A1 | 4/2009 | Kock |
| 2009/0191310 A1 | 7/2009 | Zyzak |
| 2010/0040729 A1 | 2/2010 | Sahagian |
| 2010/0040750 A1 | 2/2010 | Assaad |
| 2010/0051419 A1 | 3/2010 | Desai |
| 2010/0055259 A1 | 3/2010 | Bourg |
| 2010/0062123 A1 | 3/2010 | Anderson |
| 2010/0080868 A1 * | 4/2010 | Crosby et al. .................. 426/52 |
| 2010/0112177 A1 | 5/2010 | Bourg, Jr. |
| 2010/0255167 A1 | 10/2010 | Bourg |
| 2011/0050880 A1 | 3/2011 | Bourg, Jr. |

FOREIGN PATENT DOCUMENTS

| | | |
|---|---|---|
| EP | 113940 A1 | 7/1984 |
| EP | 1419702 A1 | 5/2004 |
| EP | 1419703 A1 | 5/2004 |
| ES | 2019044 | 2/1990 |
| FR | 874453 | 8/1942 |
| GB | 156905 | 1/1921 |
| GB | 1132296 | 10/1968 |
| GB | 1519049 | 7/1978 |
| GB | 335214 | 9/1980 |
| JP | 68006927 | 9/1965 |
| JP | 70009815 | 10/1966 |
| JP | 57100179 | 12/1980 |
| JP | 62048351 A | 3/1987 |
| JP | 4104753 | 4/1992 |
| JP | 6030782 A | 2/1994 |
| JP | 06169713 | 6/1994 |
| JP | 05123126 | 5/1998 |
| JP | 10136883 | 5/1998 |
| JP | 11056280 | 3/1999 |
| JP | 11178536 | 7/1999 |
| JP | 2004180563 | 7/2004 |
| JP | 2004-313183 | 11/2004 |
| JP | 2004313183 | 11/2004 |
| JP | 2005278448 | 10/2005 |
| KR | 910006619 B1 | 8/1991 |
| RU | 2048512 | 11/1995 |
| RU | 2078797 | 5/1997 |
| RU | 2140927 | 11/1999 |
| RU | 2216574 | 11/2003 |
| SU | 1822863 | 6/1993 |
| WO | 9601572 | 1/1996 |
| WO | 0004784 | 2/2000 |
| WO | 0191581 | 12/2001 |
| WO | 2004004484 | 1/2004 |
| WO | 2004026043 | 4/2004 |

(56) References Cited

FOREIGN PATENT DOCUMENTS

| WO | 2004028276 | 4/2004 |
|---|---|---|
| WO | 2004028277 | 4/2004 |
| WO | 2004028278 | 4/2004 |
| WO | 2004032647 | 4/2004 |
| WO | 2004032648 | 4/2004 |
| WO | 2004039174 | 5/2004 |
| WO | 2004040999 | 5/2004 |
| WO | 2004047559 | 6/2004 |
| WO | 2004060078 | 7/2004 |
| WO | 2004080205 | 9/2004 |
| WO | 2006128843 | 12/2006 |
| WO | 2007106996 | 9/2007 |
| WO | 2008061982 | 5/2008 |

OTHER PUBLICATIONS

Medical Dictionary: definition of dextrose; published Sep. 7, 2003; http://web.archive.org/web/20030907233102/http://www.medterms.com/script/main/art.asp?ArticleKey=7040.*

Dobarganes, Carmen, et al., "Interactions between fat and food during deep-frying," Eur. J. Lipid Sci. Tech. 2000, vol. 102, pp. 521-528.

Erickson, Michael D., ed., Book entitled "Deep Frying—Chemistry, Nutrition and Practical Applications," 2d edition, pp. 262, 263, 274, 275.

Farid, M.M., et al., "The analysis of heat and mass transfer during frying of food using a moving boundary solution procedure," Heat and Mass Transfer, vol. 34, 1998, pp. 69-77.

Fleck, Fiona, "Experts launch action on acrylamide in staple foods," British Medical Journal, Jul. 20, 2002, p. 120.

Jackson, Lauren, "Formation of acrylamide in food," US FDA Centre for Food Safety and Applied Nutrition, National Centre for Food Safety and Technology, Summit—Argo, IL, Dec. 4-5, 2002 presentation, 32 pages.

Lotfi, Ehsan, et al. "A new approach for automatic quality control of fried potatoes using machine learning," Islamic Azad University, Mashad Branch, Ferdowsi University of Mashad, Khorasan Research Center for Technology Development, Mar. 11, 2009, 4 pages.

Pedreschi, Franco, et al. "Acrylamide content and color development in fried potato strips," ScienceDirect Journal of Food Engineering 39 (2006) pp. 40-46.

Research Disclosure 15172, New process for the manufacture of potato-chips from different types of potatoes (not selected), Nov. 1976, 1 page.

Talburt & Smith (eds.), Potato Processing 4th Ed. 1987, "Improving the Color of Potato Chips," pp. 406-413.

Tareke, E., et al., "Acrylamide: A Cooking Carcinogen?" Chem. Res. Toxicol. 2000, vol. 13, pp. 517-522, Published on Web May 27, 2000 (6 pages).

NFRI Report, published Jul. 1, 2004, Report on the symposium named "Chemistry and Safety of Acrylamide in Food" held by the Agricultural and Food Chemistry Division of the American Chemical Society held on Mar. 28-31, 2004 in Anaheim, CA, USA, published by the National Food Research Institute (NFRI) of the National Agricultural and Food Research Organization of Japan (NARO), available at http://oasys2.confex.com/acs/227nm/techprogram/D941.HTM.

Summary Report of "2004 Acrylamide in Food Workshop: Update—Scientific Issues, Uncertainties, and Research Strategies," held on Apr. 13-15, 2004 in Chicago, IL, USA, published on Aug. 6, 2004, by the National Food Research Institute (NFRI) of the National Agricultural and Food Research Organization of Japan (NARO), available at http://222.jifsan.umd.edu/docs/acry2004.

Decision of Rejection, Japanese Pat. App. No. 2007-544461 dated Mar. 16, 2010, translated into English (2 pages).

"Kagaku Dai-jiten (Encyclopedia of Chemistry)," edited by Ohki Michinori, et al., 1989, pp. 317, 96, and 1661 (6 pages).

"Shokuhin Tenkabutsu Binran (List of Food Additives)," 1964, p. 249 (2 pages).

Martinez-Bustos, F., "Effect of the components of maize on the quality of masa and tortillas during the traditional nixtamalisation process," Journal of the Science of Food and Agriculture, vol. 81, pp. 1455-1462, Aug. 13, 2001, 8 pages.

Sefa-Dedeh, S., "Effect of nixtamalization on the chemical and functional properties of maize," Food Chemistry, vol. 86, pp. 317-324, Aug. 14, 2003, 8 pages.

Note of the Meeting of Experts on Industrial Contaminants in Food (European Commission): Acrylamide Workshop, Oct. 20-21, 2003, Information on Ways to Lower the Levels of Acrylamide Formed in Food, 6 pages.

Robert, Fabien, et al."Acrylamide Formation from Asparagine under Low-Moisture Maillard Reaction Conditions. 1. Physical and Chemical Aspects in Crystalline Model Systems," J. Agric. Food Chem, 2004, 52, 6837-6842, 6 pages.

Afssa, French Food Safety Agency, "Acrylamide: Information Point," Jul. 24, 2002 (11 pages).

Weisshaar, Rudiger, et al. "Formation of Acrylamide in Heated Potato Products—Model Experiments Pointing to Asparagine as Precursor" Pub. Oct. 3, 2002, Deutsche Lebensmittel-Rundschau 98 Jahrgang, Heft (4 pages).

Williams, J.S.E., "Influence of Variety and Processing Conditions on Acrylamide Levels in Fried Potato Crisps," ScienceDirect Food Chemistry 90 (2005), pp. 875-881.

Wulfsberg, Gary, Inorganic Chemistry book, University Science Books, 2000, p. 289.

Yarnell, Amanda, "Acrylamide Mystery Solved," Chemical & Engineering News, Oct. 4, 2002 found at http://pubs.acs.org/cen/today/oct4.html (3 pages).

Yaylayan, Varoujan A., et al., "Why Asparagine Needs Carbohydrates to Generate Acrylamide," J. Agric. Food Chem. 2003, vol. 51, pp. 1753-1757.

Zhang, Yu, et al., "Study on Formation of Acrylamide in Asparagine-Sugar Microwave Heating Systems Using UPLC-MS/MS Analytical Method," ScienceDirect, Food Chemistry 108 (2008), pp. 542-550.

Zyzak David V. et al., "Acrylamide Formation Mechanism in Heated Foods," J. Agric. Food Chem. 2003, vol. 51, pp. 4782-4787.

*Zyzak, David, et al.* v. *Elder, Vincent Allen, et al.*, Board of Patent Appeals and Interferences, Judgment-Arbitration-Bd.R. 126(f), Apr. 14, 2008, 2 pages.

Health Canada Food & Nutrition "Acrylamide and Food" Dec. 1, 2005 (3 pages).

Health Canada Food & Nutrition "Major pathway of formation of acrylamide in foods and possible approaches to mitigation" Mar. 11, 2005 (2 pages).

Health Canada OCAPI Involving You publication, "Acrylamide and Food," vol. 2, No. 1, Autumn 2002, 2 pages.

Heldman, Dennis R., et al. "Principles of Food Processing" book, 1997, p. 193.

Hughes B.P. "The amino acid composition of potato protein and of cooked potato" British J. of Nutrition, vol. 12, Issue 02, May 1958, pp. 188-195.

Igoe, Robert, Dictionary of Food Ingredients, 4th ed., (Aspen Publishers 2001), pp. 24, 35, 43, 109, and 167.

Institute of Food Science & Technology (UK) "Acrylamide Information and News" found at http://www.ifst.org/acrylmd.htm Sep. 6, 2002, 5 pages.

Ishihara, Katsuyuki, et al. "Examination of Conditions inhibiting the Formation of Acrylamide in the Model System of Fried Potato" Biosci. Biotechnol. Biochem., 70(7), 2006, pp. 1616-1621.

Jacobs, Morris B., Ph.D. "The Chemistry and Technology of Food and Food Products" textbook, 1951, pp. 221-226.

Jespersen, Neil "Chemistry" from Barron's College Review Series on Science, 1997, p. 210.

Jung, M.Y. et al. "A Novel Technique for Limitation of Acrylamide Formation in Fried and Baked Corn Chips and in French Fries", J. Food Science vol. 68, No. 4, 2003, pp. 1287-1290.

Kim, Kyu-Won, et al. "Asparaginase II of *Saccharomyces cerevisiae*" J. Biological Chem. 263 (24), Aug. 25, 1988, pp. 11948-11953.

Kim, Cheong Tae, et al. "Reducing Acrylamide in Fried Snack Products by Adding Amino Acids" J. Food Science vol. 70, No. 5, 2005, pp. C354-C358.

Kirk, Raymond E., et al. "Enciclopedia de Tecnologia Quimica" 1962, pp. 986-998.

(56) References Cited

OTHER PUBLICATIONS

Kita, Agnieszka, et al. "Effective Ways of Decreasing Acrylamide Content in Potato Crisps During Processing" J. Agric. Food Chem., Oct. 15, 2004, vol. 52, pp. 7011-7016.
Kretovich, V.L. "Plant Biochemistry" book, 1986, pp. 8-11 (English translation).
Lawrence, James E., "Acrylamide in Food" memorandum, Health Canada Food Program publication, Sep. 23, 2002, 1 page.
Low, Mei Yin, et al. "Effect of Citric Acid and Glycine Addition on Acrylamide and Flavor in a Potato Model System" J. Agric. Food Chem. 2006, 54, pp. 5976-5983.
Martin, Fiona L., et al. "Formation of Strecker Aldehydes and Pyrazines in a Fried Potato Model System" J. Agric. Food Chem. 2001, 49, pp. 3885-3892.
May, N.J., et al. "Acrylamide formation in deep-fried potato products and removal of acrylamide precursors" Food Australia 58 (10) Oct. 2006, pp. 488-493.
Mizukami, Yuzo, et al. "Analysis of Acrylamide in Green Tea by Gas Chromatography—Mass Spectrometry" J. Agric. Food Chem. 2006, 54, pp. 7370-7377.
Mottram, Don—The University of Reading, "Acrylamide in Cooked Foods—the Latest 'Food Scare'" 2002 (44 pages).
Mottram, Donald S. "Acrylamide is formed in the Maillard reaction" Nature Magazine, Oct. 3, 2002, found at www.nature.com/nature (1 page).
Murray, Lindsay, "Acrylamide" Center for Clinical Toxicology, Vanderbilt Univ. Med. Ctr., Jul. 1996 found at http://www.inchem.org/documents/pims/chemical/pim652.htm, Jun. 1998 (8 pages).
Mustafa, Arwa, et al. "Factors Influencing Acrylamide Content and Color in Rye Crisp Bread" J. Agric. Food Chem. 2005, 53, pp. 5985-5989.
Neergaard, Lauran "Scientists: Chemical Reaction May Create Carcinogen" Health Zone found at http://www.cjonline.com/stories/093002/hea_carcinogen.shtml, Sep. 30, 2002 (3 pages).
Nielsen, Per Munk "Enzyme Technology for Production of Protein-Based Flavours" Novo Nordisk A/S 1995 (6 pages).
Ou, Shiyi, et al. "Reduction of Acrylamide Formation by Selected Agents in Fried Potato Crisps on Industrial Scale" ScienceDirect, Innovative Food Science and Emerging Technologies 9 (2008) pp. 116-121.
Pedreschi, Franco, et al. "Acrylamide reduction under different pre-treatments in French fries" ScienceDirect Journal of Food Engineering 79 (2007) pp. 1287-1294.
Pedreschi, Franco, et al. "Color development and acrylamide content of pre-dried potato chips" ScienceDirect Journal of Food Engineering 79 (2007) pp. 786-793.
Pedreschi, Franco, et al. "Color kinetics and acrylamide formation in NaCl soaked potato chips" ScienceDirect Journal of Food Engineering 79 (2007) pp. 989-997.
Pedreschi, Franco, et al. "Reduction of Acrylamide Formation in Potato Slices During Frying" Lebensm.-Wiss u.-Technol. 37 (2004) pp. 679-685.
Procter & Gamble Press Release Sep. 27, 2002 "Procter & Gamble Makes Significant Advances on Understanding Acrylamide Formation" found at http://biz.yahoo.com/prnews/020927/clf005_1.html (2 pages).
Raloff, Janet, "Hot Spuds: Golden Path to Acrylamide in Food" Science News Online, Oct. 5, 2002, vol. 162 found at http://www.sciencenews.org/20021005/fob5.asp (3 pages).
Rossell, J.B. (ed.) "Frying—Improving Quality" CRC Press, 2001, pp. 198-214 and 306-308.
Rydberg, Per, et al. "Investigations of Factors That Influence the Acrylamide Content of Heated Foodstuffs" J. Agric. Food Chem. 2003, vol. 51, pp. 7012-7018.
Segtnan, Vegard H., et al. "Screening of acrylamide contents in potato crisps using process variable settings and near-infrared spectroscopy" Mol. Nutr. Food Res. vol. 50, 2006, pp. 811-817.
Stadler, Richard H., et al. "Acrylamide from Maillard reaction products" Nature Magazine Oct. 3, 2002 found at www.nature.com/nature (2 pages).

Talburt & Smith (eds.), Potato Processing 4th Ed. 1987, Ch. 12 "Dehydrated Mashed Potatoes—Potato Granules," pp. 535-555.
Talburt & Smith (eds.), Potato Processing 4th Ed. 1987, "Improving the Color of Potato Chips," pp. 403-405.
"Temperature and Heat—Local Materials" Mar. 2003 found at http://web.archive.org/web/20030321105136/http://www.pa.uky.edu/sciworks/xtra/local.htm (3 pages).
U.S. Dept. of Health and Human Services, Public Health Service, National Toxicology Program, "9th Report on Carcinogens Revised Jan. 2001" found at http://win2000.kreatiweb.it/sanitaweb/web/Biblioteca/carcinogens/rahc/acrylamide.pdf (5 pages).
U.S. Dept. of Health & Human Services, U.S. Food and Drug Adm., Center for Food Safety and Applied Nutrition "Exploratory Data on Acrylamide in Foods" Dec. 4, 2002 found at http://www.mindfully.org/food/acrylamide-foods-fda (9 pages).
U.S. Food and Drug Administration Public Meeting "Assessing Acrylamide in the U.S. Food Supply," Sep. 30, 2002(5 pages).
Viklund, Gunilla A., et al., "Variety and Storage Conditions Affect the Precursor Content and Amount of Acrylamide in Potato Crisps," J. Sci. Food Agric. 2008, vol. 88, pp. 305-312.
Vivanti, Vittorio, et al. "Level of Acrylamide Precursors Asparagine, Fructose, Glucose, and Sucrose in Potatoes Sold at Retail in Italy and in the United States" J. Food Science, vol. 71, No. 2, 2006, pp. C81-C85.
Watson, S.A. (ed.), Corn: Chemistry and Technology, American Association of Cereal Chemists, 1987, pp. 410-420.
Webb, Edwin C., "Enzyme Nomenclature 1992," Academic Press, p. 422.
Abdel-Kader, Zakia M., "Effect of blanching on the diffusion of glucose from potatoes" (Abstract), Wiley InterScience Journals: Nahrung / Food vol. 36, Iss. 1, 1992, 1 page.
Alternative Medicine Review "Glutathione, Reduced (GSH)" vol. 6, No. 6, 2001, pp. 601-607.
Amrein, Thomas, "Influence of Thermal Processing Conditions on Acrylamide Generation and Browning in a Potato Model System," J. Agric. Food Chem. 2006, 54, pp. 5910-5916.
Ashoor, S.H. & Zent, J.B., "Maillard Browning of Common Amino Acids and Sugars," (Abstract), Wiley InterScience Journals: J. Food Science, vol. 49, Issue 4, Jul. 1984, 2 pages.
Associated Press Washington—"Habrian descubierto el origen de sustancia cancerigena en las papas fritas," Sep. 30, 2002, 2 pages.
Becalski, Adam, et al., "Acrylamide in Foods: Occurrence, Sources, and Modeling," J. Agric. Food Chemistry, 2003, vol. 51, pp. 802-808.
Becalski, Adam, et al., "Acrylamide in French Fries: Influence of Free Amino Acids and Sugars," (Abstract), J. Agric. Food Chem. 52 (12), May 22, 2004, 1 page.
Bosset, Dr. Jacques Olivier, et al. "Mitteilungen aus Lebensmitteluntersuchung und Hygiene" Jun. 2002, vol. 93, Offizielles Organ der Schweizerischen Gesellschaft fur Lebensmittel-und Umweltchemie und der Schweizerischen Gesellschaft fur Lebensmittelhygien(79 pages).
Brathen, Erland, et al., "Addition of Glycine Reduces the Content of Acrylamide in Cereal and Potato Products," J. Agric. Food Chem. 2005, vol. 53, pp. 3259-3264.
CBS News CBC.CA "Food sector told to cut down on toxins in chips, fries" Sep. 19, 2002, 2 pages.
CBC News CBC.CA "Scientists find route for toxin to form in fried, baked foods," Sep. 30, 2002, 3 pages.
CBC News CBC.CA "Some acrylamide with your fries?" Jan. 14, 2003, 6 pages.
Center for Science in the Public Interest article "New Tests Confirm Acrylamide in American Foods," found at http://www.cspinet.org/new/200206251.html, Jun. 25, 2002, 2 pages.
Centre for Molecular and Biomolecular Informatics article "An Amino Acid Bedtime Story" found at http://www.cmbi.kun.nl.gvteach/HAN/alg/infopages/bedtime.html, material from Friedli Enterprises, Gert Vriend, Apr. 18, 2000, 4 pages.
chemhelper.com Home Page for Frostburg State University—Organic Chemistry Help, article "Nucleophilic Addition to Carbonyl Groups" found at http://www.chemhelper.com/nucadd.html, 2000 (3 pages).

(56) References Cited

OTHER PUBLICATIONS

Claeys, Wendie L., et al. "Quantifying the formation of carcinogens during food processing: acrylamide," Trends in Food Science & Technology 16 (2005), pp. 181-193.
Database WPI Week 199329 Derwent Publications Ltd., London, GB; AN 1993-234163 XP002473734 & SU 1 750 586 Al (Interbios Res Assoc) Jul. 30, 1992, 1 page.
Database WPI Week 199805 Thomson Scientific, London, GB; AN 1998-042903 XP002503379, Dec. 4, 1996, 1 page.
de Barber, C. Benedito de, et al. "Reversed-Phase High-Performance Liquid Chromatography Analysis of Changes in Free Amino Acids During Wheat Bread Dough Fermentation" Cereal Chemistry, Feb. 26, 1989, vol. 66, No. 4, pp. 283-288.
de Meulenaer, Bruno, et al., "Comparison of Potato Varieties Between Seasons and Their Potential for Acrylamide Formation," J. Science Food Agric., vol. 88, 2008, pp. 313-318.
de Vleeschouwer, Kristel, et al., "Impact of pH on the Kinetics of Acrylamide Formation/Elimination Reactions in Model Systems," J. Agric. Food Chem. vol. 54, 2006, pp. 7847-7855.
de Wilde, Tineke, et al., "Influence of Fertilization on Acrylamide Formation during Frying of Potatoes Harvested in 2003," J. Agric. Food Chem., 2006, vol. 54, pp. 404-408.
Dunlop, Patricia C., et al. "Nitrogen Catabolite Repression of Asparaginase II in *Saccharomyces cerevisiae*" J. Bacteriology, Jul. 1980, vol. 143, No. 1, pp. 422-426.
El Pais.com, "Hallada la reaccion quimica que produce la acrilamida en las frituras," Jul. 15, 2009, 1 page.
European Commission—Health and Consumer Protection Directorate-General, "Opinion of the Scientific Committee on Food on new findings regarding the presence of acrylamide in food," Jul. 3, 2002, 16 pages.
European Food Safety Authority, Report of "Workshop on Acrylamide Formation in Food," Nov. 17, 2003, Brussels, 22 pages.
"FAO/WHO Joint Consultation on the Health Implications of Acrylamide in Food" Summary Report, Geneva, Switzerland, Jun. 25-27, 2002, 12 pages.
Food Safety Consultations "Health Implications of Acrylamide in Food" Report of a Joint FAO/WHO Consultation, Geneva, Switzerland, Jun. 25-27, 2002, 38 pages.
Joint FAO/WHO Expert Commission on Food Additives, 64th Meeting, Rome, Feb. 8-17, 2005, 47 pages.
Fan, Xuetong, et al. "Effectiveness of Ionizing Radiation in Reducing Furan and Acrylamide Levels in Foods" J. Agric. Food Chem. 2006, 54, pp. 8266-8270.
Fiselier, K., et al., "Brown potato Croquettes Low in Acrylamide by Coating with Egg/Breadcrumbs," Eur. Food Res. Technol. (2004) 219:111-115.
Fiselier, Katell, et al., "Higher Acrylamide Contents in French Fries Prepared from "Fresh" Prefabricates," Eur. Food Res. Technol. (2005) 221:376-381.
Food Standards Agency, "Study of Acrylamide in Food," May 17, 2002, 7 pages.
Francis, Frederick J., "Encyclopedia of Food Science and Technology," 2nd ed., 2000, pp. 2160-2161.
Freshfields Bruckhaus Deringer "Acrylamide in food—The approach of regulators across Europe" Feb. 2003 (20 pages).
Friedman, Mendel, et al., "Browning prevention in fresh and dehydrated potatoes by SH-containing amino acids," Food Additives and Contaminants, 1992, vol. 9, No. 5, pp. 499-503.
Friedman, Mendel, "Chemistry, BioChemistry, and Safety of Acrylamide. A Review," J. Agric. Food Chem., Jul. 3, 2003, vol. 51 (16), pp. 4504-4526.
Friedman, Mendel, et al., "Inhibition of Browning by Sulfur Amino Acids. 1. Heated Amino Acid-Glucose Systems," J. Agric. Food Chem., 1990, 38, pp. 1641-1647.
Friedman, Mendel "The Impact of the Maillard Reaction on the Nutritional Value of Food Proteins" Ch. 6 from The Maillard Reaction: Consequences for the Chemical and Life Sciences, Ikan, Raphael (ed.), 1996, 24 pages.
Garayo, Jagoba, et al. "Vacuum frying of potato chips" J. Food Engineering 55 (2002), pp. 181-191.
Gertz, Christian, et al. "Analysis of acrylamide and mechanisms of its formation in deep-fried products" Eur. J. Lipid Sci. Technol. 104 (2002), pp. 762-771.
Gokmen, Vural, et al., "Acrylamide formation is prevented by divalent cations during the Maillard reaction," Food Chemistry (2006) doi: 10.1016/j.foodchem.2006.08.011, 8 pages.
Granda, Claudia, et al., "Effect of Raw Potato Composition on Acrylamide Formation in Potato Chips," J. Food Science vol. 70, No. 9, 2005, Nov. 16, 2005, pp. E519-E525.
Granda, Claudia, et al. "Kinetics of Acrylamide Formation During Traditional and Vacuum Frying of Potato Chips" J. Food Process Engineering 28 (2005), pp. 478-493.
Granda, C., et al. "Reduction of Acrylamide Formation in Potato Chips by Low-temperature Vacuum Frying", J. Food Science, vol. 69, No. 8, 2004, Oct. 7, 2004, pp. E405-E411.
Grivas, Prof. Spiros, et al. "Acrylamide in Food—Mechanisms of Formation and Influencing Factors During Heating of Foods", Report from Swedish Scientific Expert Committee, Apr. 24, 2002 (22 pages).
Harmony House Foods, Inc., http://web.archive.org/web/20050425210612/www.harmonyhousefoods.com/slicedpotato.html, Apr. 25, 2005, 2 pages.
Harrison, Karl "Amino Acids and Proteins" found at http://www.chem.ox.ac.uk/mom/amino_acids/introduction.html, 1996 (2 pages).
Harrison, Karl "Molecules of the Month" found at http://www.chem.ox.ac.uk/mom/, 1996 (1 pages).
Weaver, M.L., et al., "Sugar-End in Russet Burbank Potatoes," American Journal of Potato Research, 1972, vol. 49, No. 10, pp. 376-382.

\* cited by examiner

METHOD FOR MAKING A LOW-ACRYLAMIDE CONTENT SNACK WITH DESIRED ORGANOLEPTICAL PROPERTIES

BACKGROUND OF THE INVENTION

1. Technical Field

The present invention relates to a method of producing a snack having a low level of acrylamide.

2. Description of Related Art

The chemical acrylamide has long been used in its polymer form in industrial applications for water treatment, enhanced oil recovery, papermaking, flocculants, thickeners, ore processing and permanent-press fabrics. Acrylamide precipitates as a white crystalline solid, is odorless, and is highly soluble in water (2155 g/L at 30° C.). Synonyms for acrylamide include 2-propenamide, ethylene carboxamide, acrylic acid amide, vinyl amide, and propenoic acid amide. Acrylamide has a molecular mass of 71.08, a melting point of 84.5° C., and a boiling point of 125° C. at 25 mmHg.

In recent times, a wide variety of foods have tested positive for the presence of acrylamide monomer. Acrylamide has especially been found primarily in carbohydrate food products that have been heated or processed at high temperatures. Examples of foods that have tested positive for acrylamide include coffee, cereals, cookies, potato chips, crackers, french-fried potatoes; breads and rolls, and fried breaded meats. In general, relatively low contents of acrylamide have been found in heated protein-rich foods, while relatively high contents of acrylamide have been found in carbohydrate-rich foods, compared to non-detectable levels in unhealed and boiled foods.

It is presently believed that acrylamide is formed from the presence of amino acids and reducing sugars. For example, it is believed that a reaction between free asparagine, an amino acid commonly found in raw vegetables, and free reducing sugars accounts for the majority of acrylamide found in fried food products. Asparagine accounts for approximately 40% of the total free amino acids found in raw potatoes, approximately 18% of the total free amino acids found in high protein rye, and approximately 14% of the total free amino acids found in wheat.

Acrylamide has not been determined to be detrimental to humans, but its presence in food products, especially at elevated levels, is undesirable. As noted previously, relatively higher concentrations, of acrylamide are found in food products that have been heated or thermally processed. Prior art methods of reducing the level of acrylamide adversely affect the quality and flavor of the finished product. Therefore, it would be desirable to develop a method of reducing the level of acrylamide in the end product of heated or thermally processed foods with minimal flavor impact.

SUMMARY OF THE INVENTION

The present invention is a method for making a thermally processed food product with a low acrylamide content having organoleptical properties comparable to traditional food products. According to one embodiment, dextrose is added to potato flakes with a low reducing sugar concentration to make a dough. The dough is then cooked according to prior aft methods to make a low moisture, ready to eat product with an acrylamide content lower than products made with prior art potato flakes.

The above, as well as additional features and advantages of the invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

One embodiment of the present invention is directed towards a method for making a thermally processed food product with a reduced acrylamide content having organoleptical properties comparable to traditional food products. As used herein, a thermally processed food product is defined as a food product that has been thermally processed at a food product temperature of greater than about 120° C. to moisture content of less than about 5% by weight, more preferably less than about 3% by weight, and most preferably less than about 2% by weight. Because, reducing sugars drive both flavor and acrylamide, it can be difficult to lower the level of acrylamide while retaining desired organoleptical properties. The present invention achieves that balance by adding dextrose to potato flakes with a low reducing sugar concentration. As used herein, dextrose means the D-form of glucose and the terms are used interchangeably.

Figure 1:
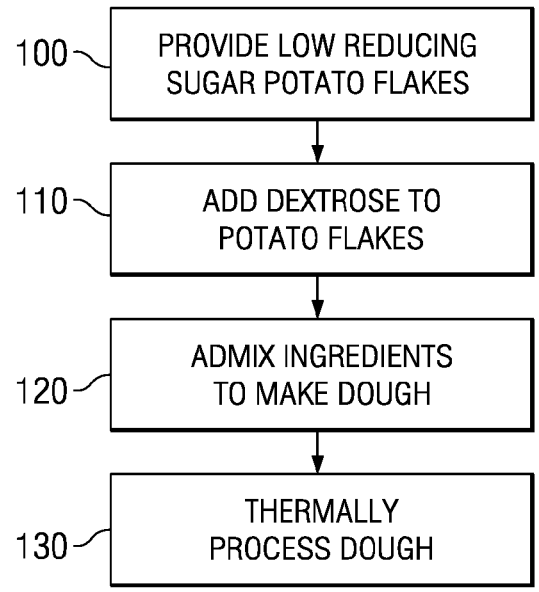
FIG. 1 depicts a general flow chart of a method for making a low-acrylamide snack piece with desired organoleptical properties in accordance with one embodiment of the present invention.

Referring to FIG. 1, the first step of one embodiment of the present invention is to provide potato flakes with a reducing sugar concentration of less than about 0.5% by weight 100. These potato flakes can be made from potatoes with a low reducing sugar concentration, such as chipping variety potatoes or potatoes harvested when the weather is relatively warm. Chipping variety potatoes are those potatoes normally used for frying, such as Saturna, Lady Rosetta, Lady Clair, Hermes, Maris Piper, Erntestolz, Agria, Atlantic, Monona, Norchip, Snowden, Kennebec, Oneida, and Tobique. Of course, such potatoes are provided for purposes of illustration and not limitation. Any potato that can be made into potato flakes having a reducing sugar concentration of less than about 0.5% by weight can be used including, but not limited to proprietary and genetically engineered potatoes. As used herein, "low reducing sugar potato flakes" are potato flakes that comprise a native total reducing sugar concentration of less than about 0.5% by weight. In one embodiment, low reducing sugar flakes comprise a native reducing sugar concentration of less than about 0.5% by weight. In one embodiment, potato flakes are treated with enzymes, fermentation, blanching, or other suitable method to achieve a total reducing sugar concentration of less than about 0.5% by weight. In one embodiment, potato flakes can be made from potatoes having relatively higher reducing sugar concentrations than chipping variety potatoes, including potatoes known to have a tendency to accumulate reducing sugars during low temperature storage such as Russet Burbank potatoes. Potato varieties can also be blended during the flake manufacturing process in accordance with the present invention. Potato flakes can be made from such low reducing sugar potatoes by methods known in the art as exemplified by methods disclosed in U.S. Pat. No. 6,197,358.

In one embodiment, dextrose is added to the low reducing sugar potato flakes 110 so that the enhanced total reducing sugar concentration is less than or about equal the total concentration of native reducing sugars in prior art potato flakes. Consequently, in one embodiment, dextrose is added to the low reducing sugar flakes to provide an enhanced total reducing sugar concentration of less than about 1.2% and more preferably less than or equal to about 0.7% by weight of the potato flakes. These "enhanced" potato flakes contain less than about 0.5% native reducing sugars and less than about 1.0% and preferably less than about 0.7% of dextrose by weight. Dextrose advantageously provides the necessary flavor drivers in the finished product.

As used herein, reducing sugars means all carbohydrate molecules containing a free aldehyde or keto group, and/or hemiacetal group, for example fructose, glucose, maltose, galactose, lactose and pentose sugars such as xylose, and other aldehyde containing compounds. Although reducing sugars are broadly defined, in one embodiment the reducing sugars comprise fructose and glucose because fructose and glucose are the predominant reducing sugars natively present in the potato raw material.

Referring back to FIG. 1, a dough is made by adding water and other minor ingredients as is well known in the art. The dough can then be thermally processed 130 for example by baking or frying, to make a final product with an acrylamide content lower than products made with prior art potato flakes having the same total reducing sugar concentration as the enhanced total reducing sugar concentration. In one embodiment, the dough is sheeted, cut, and thermally processed at a food temperature of at least about 120° C. to a moisture content of less than about 3%.

At higher temperatures, the acrylamide formation rate for fructose is faster than that of dextrose. For example, Table 1 below depicts known second order rate constants of glucose and fructose with asparagine:

TABLE 1

Second order rate constants ($\times 10^{-3}$/min) for glucose and fructose reacting with asparagine.

| | 120° C. (248° F.) | 140° C. (284° F.) | 160° C. (320° F.) | 180° C. (356° F.) | 200° C. (392° F.) |
|---|---|---|---|---|---|
| Fructose | 0.0819 | 0.369 | 1.45 | 5.04 | 15.8 |
| Glucose/ Dextrose | 0.131 | 0.308 | 0.668 | 1.35 | 2.58 |

Figure 2:
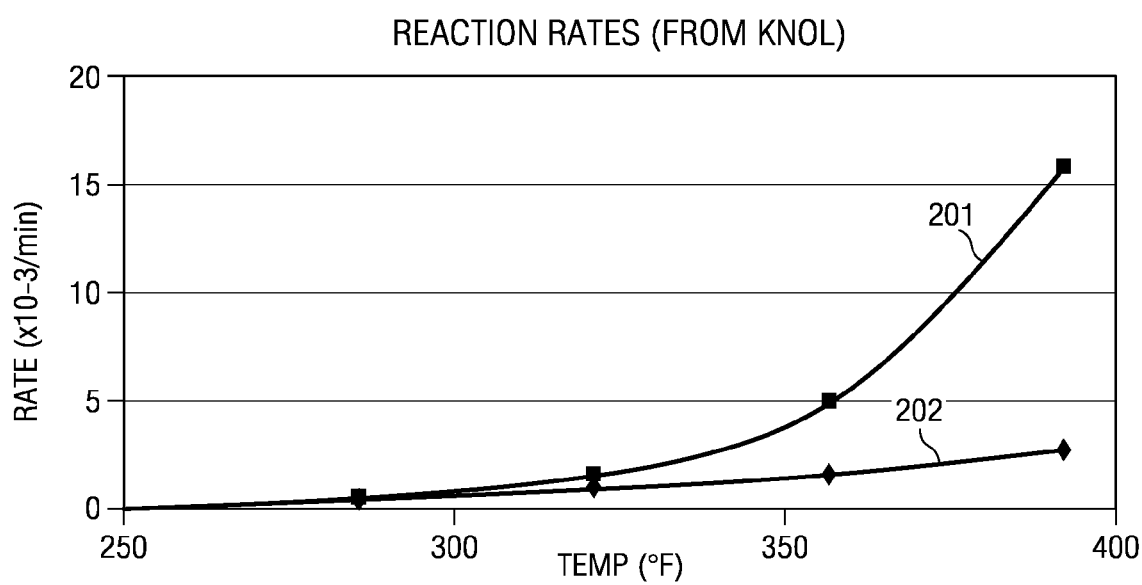
FIG. 2 depicts a chart comparing the acrylamide reaction rates of fructose and dextrose.

A chart, based on the data provided in Table 1, depicting the comparative second order rate constants of fructose and dextrose is shown in FIG. 2. Curve 201 represents the second order rate constant of fructose as a function of temperature and curve 202 represents the second order rate constant of dextrose as a function of temperature. The rate constants are similar up to about 300° F. At about 320° F. the rate constant of fructose is slightly higher than that of dextrose, at about 350° F. the rate constant of fructose is approximately four times that of dextrose, and at about 390° F., the rate of fructose is approximately six times higher than the rate constant of dextrose.

Through adding dextrose to low reducing sugar flakes it was discovered that the native reducing sugars, including fructose, dextrose and others, found in potatoes have a faster acrylamide formation rate than dextrose alone. Thus, the flavor of a product produced from flakes having a low reducing sugar concentration can be enhanced by the addition of dextrose without suffering the acrylamide level from a product with the same total amount of reducing sugars where only native reducing sugars are present. Of the native reducing sugars present in potatoes, glucose and fructose predominate and are generally present in near equal amounts. Other reducing sugars, such as maltose, are generally present in very small amounts, comprising less than about 5% of the native reducing sugars. By increasing the ratio of dextrose to fructose in the potato flakes to increase the total reducing sugar concentration, the difference in the reaction rates of dextrose and fructose and dextrose and native reducing sugars can be exploited to yield a product with enhanced flavor and lower acrylamide content. In one embodiment, the amount of dextrose added to the low reducing sugar potato flakes increases the molar ratio of dextrose to fructose to at least about 2:1 and in one embodiment at least about 3:1.

In one embodiment, an effective amount of dextrose is added to the low reducing sugar potato flakes. As used herein, an "effective amount" means an amount of dextrose that achieves at least about 25% less acrylamide than products made with prior art flakes having only native reducing sugars at the same total reducing sugar concentration as the enhanced total reducing sugar concentration. In one embodiment, the amount of dextrose added constitutes at least half of the enhanced total reducing sugar concentration in the dough.

Example

Comparative tests were run between a control sample of prior art potato flakes and low reducing sugar flakes (purchased from Washington Potato, in Warden, Wash.) having a native total reducing sugar concentration of 0.2% by weight. Various levels of dextrose were added to the flakes and the total concentration of reducing sugars was recorded. The fabricated chips were fried and tested for acrylamide and moisture content. The results are shown in the Table 2 below.

TABLE 2

Comparative tests of prior art flakes and low reducing sugar flakes with dextrose added

| Sample | Acrylamide, ppb | Moisture, % | Total Reducing Sugar, % |
|---|---|---|---|
| Control | 343 | 1.99 | 1.3 |
| Potato flakes + 0.4% dextrose | 216 | 1.83 | 0.6 |
| Potato flakes + 1.0% dextrose | 294 | 1.86 | 1.2 |
| Potato flakes + 2.0% dextrose | 516 | 1.67 | 2.2 |

As can be seen, the selective use of dextrose as the primary reducing sugar in potato flakes reduces acrylamide with minimal flavor impact. Adding 0.4% dextrose to low reducing sugar flakes to obtain a total reducing sugar concentration of 0.6% provides a chip having 37% less acrylamide than the control even when fried to a lower moisture content than the control. The addition of 1.0% dextrose to reach a total reducing sugar concentration of that substantially similar to the native reducing sugar level of prior art potato flakes achieves 14% lower acrylamide content at a lower moisture content. In one embodiment, dextrose is added in an amount to obtain a total reducing sugar concentration of about 1.2% or less, which achieves a lower acrylamide level while providing fried potato chips having a flavor profile on parity with fried potato chips made from prior art flakes.

Dextrose advantageously provides many of the same benefits as the native reducing sugars without the higher kinetic acrylamide reaction rates. For example, the flavor drivers provided by native reducing sugars are due to Maillard reaction compounds, Strecker aldehydes, and pyrazines. When the inventive dough was tested for these flavor drivers, the levels of flavor drivers were comparable to fried potato chips made from prior art potato flakes. Interestingly, Maillard reaction compounds in the finished product made with the inventive dough increased with increasing levels of dextrose. Strecker aldehydes were similar to control at 1% dextrose and higher than control at 2% dextrose. Pyrazines in the finished product were similar to control at 2% dextrose.

Though the present invention has been described with reference to potato flakes, it is to be understood that the invention is also applicable to potato granules and corn masa as corn generally contains near equal amounts of fructose and glucose. The examples and explanations given are not meant to limit the present invention.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

We claim:

1. A method for making a potato product, said method comprising the steps of:
   a) providing potato flakes having a reducing sugar concentration of less than about 0.5% by weight,
   b) adding an effective amount of dextrose to said potato flakes to make a dough, wherein said effective amount of dextrose raises the total reducing sugar concentration of said potato flakes to less than about 1.2%, and wherein the amount of dextrose added to the potato flakes increases a molar ratio of dextrose to fructose in said dough to at least about 2:1; and
   c) cooking the dough at a temperature of at least about 120° C. to a moisture content of less than about 3%, thereby producing a low moisture ready to eat product.

2. The method of claim 1 wherein said effective amount of dextrose raises the total reducing sugar concentration of said potato flakes to less than about 0.7%.

3. The method of claim 1 wherein said potato flakes are made from potatoes with a native reducing sugar concentration of about 0.2% by weight.

4. The method of claim 1 wherein said potato flakes are made from potatoes or potato flakes treated with enzymes.

5. The method of claim 1 wherein said potato flakes are made from potatoes or potato flakes treated with yeast.

6. The method of claim 1 wherein said potato flakes are made from potatoes or potato flakes treated by fermentation.

7. The method of claim 1 wherein said potato flakes are made from potatoes or potato flakes treated by blanching.

8. The method of claim 1 wherein said dextrose added at step b) comprises at least 50% of an enhanced total reducing sugar content.

9. The method of claim 1 wherein the ratio of dextrose to fructose in said dough is at least about 3:1.

10. Potato flakes for making a thermally processed food product, said potato flakes comprising less than about 0.5% reducing sugars and less than about 1.0% of added dextrose by weight of said flakes, wherein the ratio of dextrose to fructose is at least about 2:1.

11. The potato flakes of claim 10, wherein a total reducing sugar concentration of said potato flakes is less than about 0.7% by weight of said flakes.

12. The potato flakes of claim 10 wherein said potato flakes are made from potatoes with a low reducing sugar concentration.

13. The potato flakes of claim 10 wherein said potato flakes are made from potatoes or potato flakes treated with enzymes.

14. The potato flakes of claim 10 wherein said potato flakes are made from potatoes or potato flakes treated with yeast.

15. The potato flakes of claim 10 wherein said potato flakes are made from potatoes or potato flakes treated by fermentation.

16. The potato flakes of claim 10 wherein said potato flakes are made from potatoes or potato flakes treated by blanching.

17. The potato flakes of claim 10 wherein said dextrose comprises at least 50% of an enhanced total reducing sugar content.

18. The potato flakes of claim 10 wherein the ratio of dextrose to fructose is at least about 3:1.

19. The method of claim 1 wherein said potato flakes of step a) are made from potatoes comprising glucose and fructose in near equal amounts.

20. The method of claim 1 wherein said potato product comprises less than 294 ppb of acrylamide.

* * * * *